United States Patent [19]
Jones

[11] Patent Number: 5,377,056
[45] Date of Patent: Dec. 27, 1994

[54] DIGITAL DATA TAPE READING DEVICE

[75] Inventor: Kevin L. Jones, Bristol, Great Britain

[73] Assignee: Hewlett-Packard Company, Palo Alto, Calif.

[21] Appl. No.: 838,409

[22] PCT Filed: Jul. 5, 1991

[86] PCT No.: PCT/GB91/01106

§ 371 Date: Mar. 6, 1992

§ 102(e) Date: Mar. 6, 1992

[87] PCT Pub. No.: WO92/02016

PCT Pub. Date: Feb. 6, 1992

[30] Foreign Application Priority Data

Jul. 25, 1990 [EP] European Pat. Off. ......... 90308143.8

[51] Int. Cl.5 .............................................. G11B 15/48
[52] U.S. Cl. .................................. 360/74.1; 360/672.1
[58] Field of Search ................... 360/74.1, 74.4, 72.1; 395/250

[56] References Cited

U.S. PATENT DOCUMENTS 4,821,129 4/1989 Culp ............................... 360/74.1 X

FOREIGN PATENT DOCUMENTS

0324542A2 7/1989 European Pat. Off. .
3933500A1 4/1990 Germany .
WO89/07296 8/1989 WIPO .

*Primary Examiner*—Aristotelis Psitos
*Assistant Examiner*—James T. Wilson

[57] ABSTRACT

A digital tape reading device comprises an arrangement wherein when a buffer full signal is generated the tape continues to move until the end of a group of data. When buffer space becomes available, the device recovers the tail end of the group of data. Upon reaching the end of the group of data, the device repositions the tape to the beginning of the group to recover only the unread data, skipping the previously read data.

6 Claims, 3 Drawing Sheets

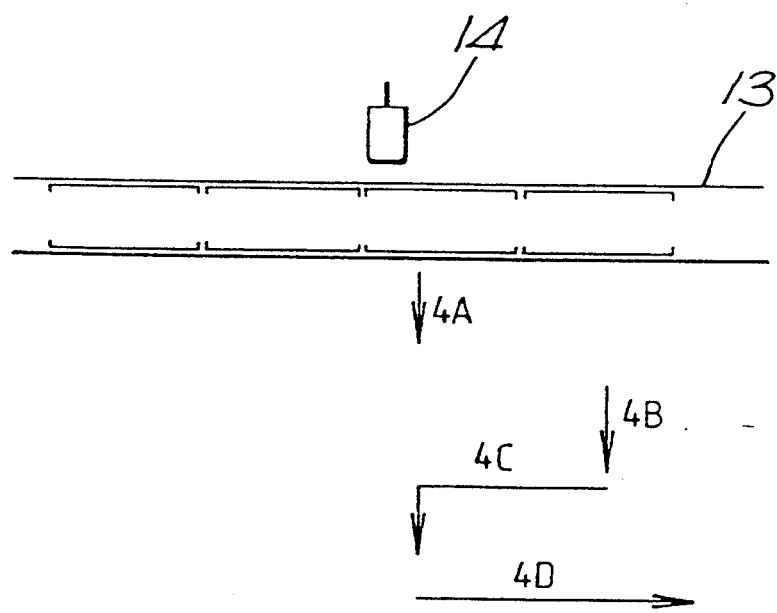
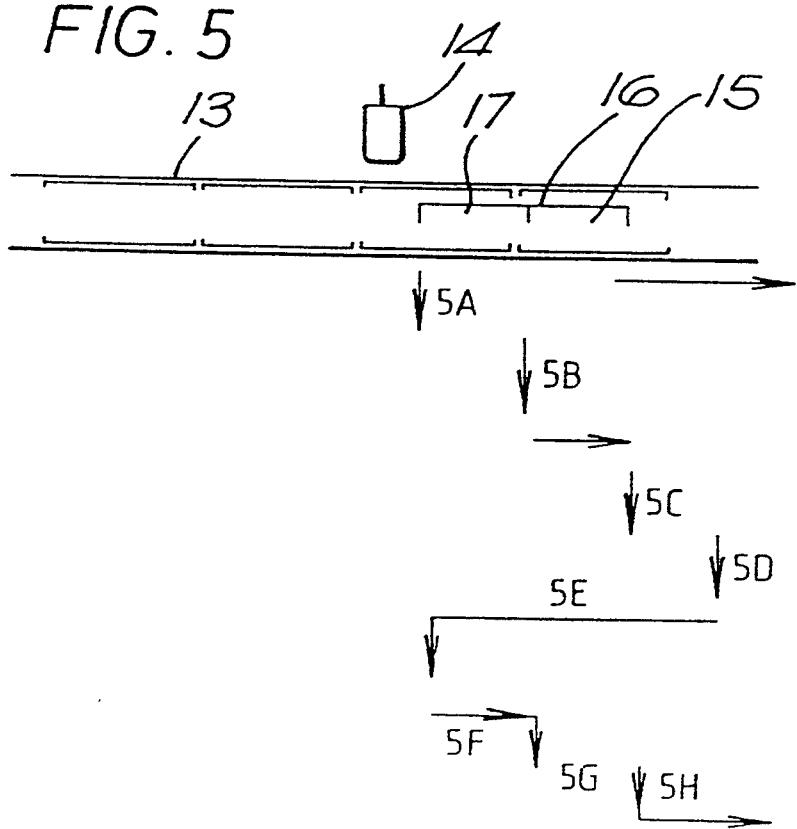

DIGITAL DATA TAPE READING DEVICE

BACKGROUND OF THE INVENTION

The invention relates to a digital data tape reading device. Data is stored by magnetic, optical or magnetic-optical techniques on disks. For large amounts of data, tape is a more convenient storage medium physically. Only magnetic techniques are used currently for tape storage, although other techniques can be envisaged.

In order to read or write data the storage medium (disk or tape) must be moved relatively to a read/write head arrangement. Repositioning with respect to the head arrangement is frequently necessary and in the case of tape devices, repositioning means stopping and restarting the tape. Repositioning causes wear of the tape drive mechanism and should be kept to a minimum. Repositioning is necessitated by differences in the data transfer rate of equipment to or from which the tape data is being supplied. Thus, a computer coupled to a tape storage device may have an inherent data transfer rate which is permanently less than the native transfer rate of data to or from the tape, or the computer data transfer rate may fluctuate because of other demands made on the computer processor.

Temporary fluctuations in relative data transfer rates may be handled by an electronic buffer between the computer and the tape device, the buffer being capable of accepting and feeding out data at differential rates. Permanent differences between the computer data transfer rate and the native tape data transfer rate will cause the buffer to empty or fill, depending on the direction of data flow. Then repositioning would normally become necessary. In order to avoid this when writing to tape it has been proposed to allow the tape to continue to run and to write to the tape, while awaiting the arrival of more data, "amble" tracks which include no data. The "amble" tracks are ignored when the tape is read.

The present invention, on the other hand, addresses the problem of reading data from a tape into equipment having an inherent data transfer rate which is lower than the native data transfer rate of the tape.

SUMMARY OF THE INVENTION

According to the invention there is provided a digital data tape reading device for reading data from a tape and supplying the data to equipment, the device comprising a read head arrangement and tape motor mechanism for moving the tape past the read head arrangement; an electronic buffer which is filled by data as it is read from the tape and which is emptied of data as it is fed to the equipment; and tape control equipment responsive to the data level in the buffer to stop the tape and reposition the tape with respect to the read head arrangement, the tape control equipment including means:

(a) responsive to a buffer full signal from the buffer to determine a restart position to which the tape must next be repositioned, this tape position corresponding to the head of a portion of data to be next fed to the buffer, hereinafter referred to as the new data;

(b) effective to allow the tape to run on after receipt of the buffer full signal, without reading data;

(c) responsive to a buffer space available signal from the buffer to commence reading data to the buffer from the current tape position, which data is the tail of the new data;

(d) effective to stop the tape at the end of the said tail and reposition the tape to the restart position;

(e) effective then to read the head of the new data and place it in the buffer; and (f) effective to skip the already read tail of the new data.

While the invention is applicable to data tapes recorded in many different formats, the preferred format is the digital data storage (DDS) format which is described in the document "Digital Data Storage Format Description" (Revision B, October 1988) available from Hewlett-Packard Limited, Bristol, England. In this format the head arrangement is a helical-scan arrangement and data is recorded on the tape in discrete groups. Each aforesaid portion of new data is preferably a complete group. By using the invention one more group is read per reposition cycle and this has a significant effect in reducing the number of repositions in DDS drives where the buffer can hold only a small number of groups.

BRIEF DESCRIPTION OF DRAWINGS

The invention will further be described with reference to the accompanying drawings, of which:

FIG. 4 is a schematic drawing illustrating the operation of a prior art digital tape reading device; and FIG. 5 is a schematic drawing illustrating the operation of a digital tape reading device in accordance with the invention;

DETAILED DESCRIPTION OF THE PREFERRED EMBODIMENT

Figure 1:
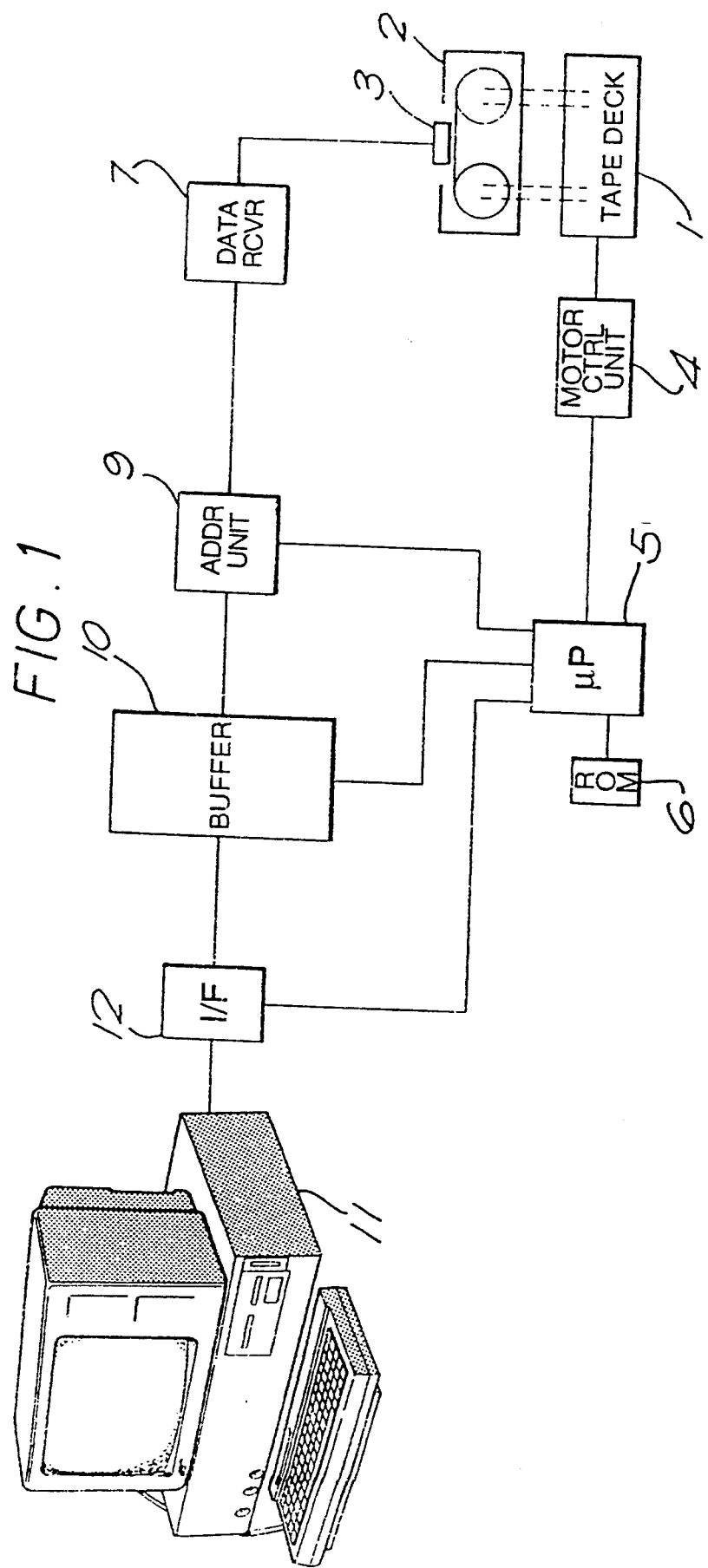
FIG. 1 is a block schematic diagram of a digital tape reading device embodying the invention.

Referring to FIG. 1 there is illustrated a DDS tape system which comprises a tape deck 1 which has a motor (not shown) for driving a tape cassette 2 past a helical-scan head arrangement 3. Data is written and read in discrete groups. A motor control unit 4 is effective to start, stop, drive and reverse the tape motor under control of signals from a microprocessor 5. The micro-processor runs under control of a program stored in a Read-only memory (ROM) 6.

As the tape is read by the head arrangement data signals recorded on the tape are recovered by data recovery circuitry 7 and the digital data signals are directed by an addressing unit 9 to appropriate addresses in an electronic data buffer 10. From the buffer the data is extracted to computer equipment 11 via an interface 12.

The micro-processor 5 controls the passage of data through the buffer and receives information on output data flow from the interface 12. Accordingly, the processor determines the extent to which the buffer is full. The DDS system controls data flow in group format.

If the data transfer rate to the computer equipment is consistently less than the native tape data transfer rate then the buffer will become full. When this happens it is clear that repositioning of the tape is required because the data flow from the tape will over-run the capacity of the system to hold it.

In accordance with prior practice the following method of data-flow management was employed:

1. Start with an empty buffer.
2. Retrieve information from the tape, placing it in the buffer.
3. Concurrent with the filling of the buffer, transfer data from the buffer "out" to the computer equipment.
4. When the buffer is full the information flow from the tape must stop. The mechanical inertia involved with the relative motion of the head and tape cannot be overcome instantly. The tape will continue to pass the head until it has been decelerated. The tape must then be moved in reverse until the head position precedes the next unread group of information. This process is known as repositioning.
5. Concurrent with repositioning, the flow of information out of the buffer continues, thus emptying the buffer.
6. When the buffer is on the point of being empty, normal head/tape relative velocity is incurred, and the flow of information from the tape resumes.
7. The process is repeated from step 2.

Figure 2:
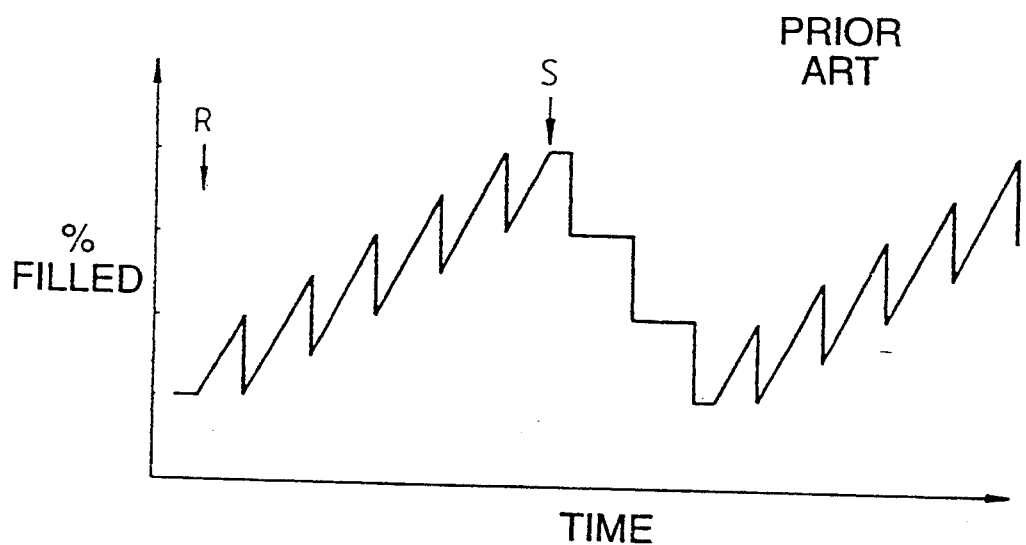
FIG. 2 is a graph illustrating buffer utilisation in a prior art digital tape reading device.

FIG. 2 is a graph showing the variation with time (abscissa) of the extent to which the buffer is full (ordinate) in the prior art arrangement. The saw-tooth effect is due to the fact that an entire group must be present in the buffer in order for information to be recovered from it. When all the information has been recovered the entire group becomes free. The drive must maintain at least one group in the buffer at all times in order to provide a continuous flow of information out of the drive. The time at which reading is started is shown at R and the time at which reading is stopped and repositioning is started is shown as S.

In accordance with the invention, on the other hand, the data flow rules 4 to 7 (above) become modified as follows:

4. When the buffer becomes full the information flow from the tape must stop.
5. Allow head/tape motion to continue such that the head starts traversing the next group of information without placing it in the (full) buffer.
6. If a group's worth of space becomes available in the buffer before the head has traversed the group on tape, then RETRIEVE THE TAIL-END OF THE GROUP from the tape and place it in the buffer.
7. Reposition the tape (as normal).

The net effect of this addition is that for each reposition, more information is transferred. This reduces the number of repositions the device has to perform, thus reducing mechanical wear and enhancing reliability. The graph of FIG. 3 illustrates the effect of this system with respect to the quantity of information in the buffer at any given time.

Figure 3:
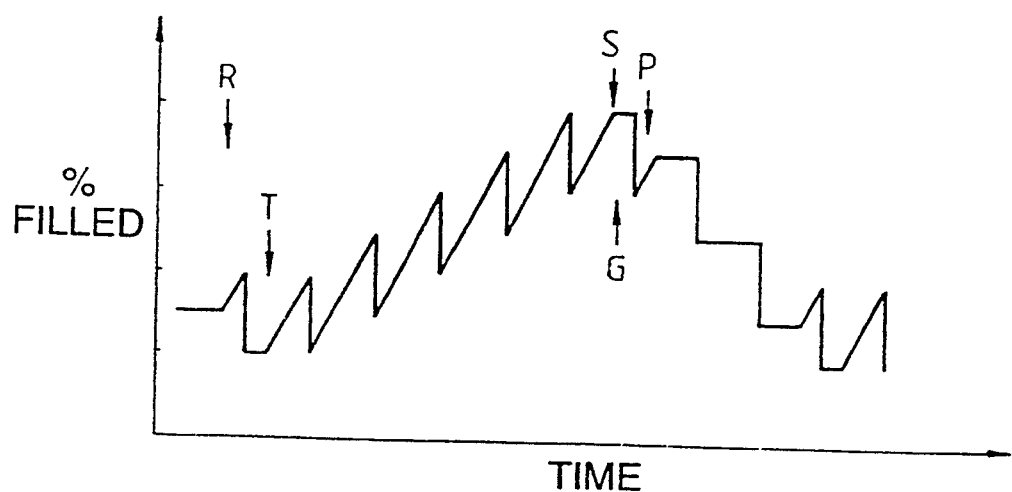
FIG. 3 is a graph illustrating buffer utilisation in a digital tape reading device embodying the invention.

With reference to FIG. 3, the following functions are effected at the respective times R Start reading
T Tail end skip (tail end of block already read)
S Stop reading
G Skip until a group is freed from the buffer (making space available to read into)
P Tail end read, start repositioning.

The control of these functions is effected by the micro-processor of FIG. 1 under the control of the program in the ROM. In particular the addressing unit is controlled to direct the head of the new data group to the appropriate position in the buffer ahead of the already-read tail. In this way the data is fed out from the buffer in the appropriate order.

In FIG. 4 there is shown a tape 13 running past a tape head 14 and there is illustrated a repositioning procedure in accordance with the prior art. The buffer is filled at 4A, when reading ceases and the tape drive is instructed to stop. The tape stops at 4B and 4C illustrates repositioning. Reading new data then commences (4D).

FIG. 5 shows an operation sequence in accordance with the invention. A buffer full signal is issued at 5A. Reading stops but the tape continues to run, no "stop" control signal being issued. At 5B a "buffer space available" signal issues and reading of the tail 15 of new data 16 begins. At 5C a tape stop signal is issued and reading stops. At 5D the tape stops. 5E represents repositioning to the restart position at the beginning of the new data. 5F shows restart and reading the head 17 of the new data. At 5G the tail 15 of the new data is skipped (not read) and at 5H reading recommences.

I claim:

1. A digital tape reading device for reading data from a tape and supplying data to equipment, comprising:
   a read head arrangement;
   a tape motor mechanism for moving the tape past the read head arrangement;
   an electronic buffer for storing data as it is read from the tape by the read head arrangement and for supplying stored data to the equipment; and,
   tape control equipment including means for:
   receiving a buffer full signal from the buffer and upon receipt of the buffer full signal, determining a restart position to which the tape must be repositioned by the tape motor mechanism, the restart position corresponding to the beginning of data that was next to be fed to the buffer prior to the receipt of the buffer full signal;
   controlling the tape motor mechanism to allow the tape to run on after receipt of the buffer full signal;
   receiving a buffer space available signal from the buffer and upon receipt of the buffer space available signal commencing the reading of data by the read head arrangement to the buffer from the current tape position, which data is the tail of the data that was next to be fed to the buffer prior to the receipt of the buffer full signal;
   controlling the tape motor mechanism to stop the tape at the end of said tail of said data that was next to be fed to the buffer prior to the receipt of the buffer full signal and to reposition the tape to the restart position at the beginning of said data that was next to be fed to the buffer prior to the receipt of the buffer full signal;
   then controlling the read head arrangement to read the head of the data that was next to be fed to the buffer prior to the receipt of the buffer full signal and place it in the buffer; and
   controlling the read head arrangement to skip the reading of the previously read tail of the data that was next to be fed to the buffer prior to the receipt of the buffer full signal.

2. A digital tape reading device as claimed in claim 1 wherein the data is recorded on the tape in discrete groups and the said new block of data is a complete group.

3. A digital tape reading device as claimed in claim 1 wherein the data is recorded on the tape in digital data storage (DDS) format.

4. A method of reading data from a tape and supplying the data to equipment, using a digital data tape reading device having a read head arrangement, a tape motor mechanism for moving the tape past the read head arrangement, an electronic buffer which is filled with data as data is read from the tape and which is emptied of data as data is fed to the equipment, and tape control equipment responsive to quantity of data in the buffer to stop the tape and reposition the tape with respect to the read head arrangement, the method comprising the steps of:

(a) transferring data to the buffer from the tape;

(b) determining a restart position to which the tape must next be repositioned upon receipt of a buffer full signal from the buffer, this restart position corresponding to commencement on the tape of data next required to be transferred to the buffer;

(c) allowing the tape to continue moving past the read head arrangement after receipt of the buffer full signal;

(d) commencing transfer of data to the buffer from the tape at its current position upon receipt of a buffer space available signal from the buffer, which data is a terminating portion of said next-required data;

(e) stopping the tape after said terminating portion of the next-required data has been transferred and repositioning the tape to said restart position;

(f) transferring said next-required data from said commencement of the next-required data to the buffer; and (g) skipping the already transferred terminating portion of said next-required data.

5. The method as claimed in claim 4, wherein the data is recorded on the tape in discrete groups and said next-required data is a complete group.

6. The method as claimed in claim 4, wherein the data is recorded on the tape in digital data storage (DDS) format.

* * * * *